(12) United States Patent
Kammonen

(10) Patent No.: US 6,170,295 B1
(45) Date of Patent: Jan. 9, 2001

(54) I.S. MACHINE

(75) Inventor: Jarmo Kammonen, Indal (SE)

(73) Assignee: Emhart Glass S.A., Cham (CH)

( * ) Notice: Under 35 U.S.C. 154(b), the term of this patent shall be extended for 0 days.

(21) Appl. No.: 09/262,553

(22) Filed: Mar. 4, 1999

(51) Int. Cl.[7] ................................................. C03B 7/08
(52) U.S. Cl. ................................................ 65/225; 65/304
(58) Field of Search ............................... 65/207, 225, 304

(56) References Cited

U.S. PATENT DOCUMENTS

| | | | |
|---|---|---|---|
| Re. 15,600 | * | 5/1923 | Lorenz . |
| 2,810,236 | * | 10/1957 | Mumford . |
| 3,198,616 | * | 8/1965 | Havens . |
| 3,341,315 | * | 9/1967 | Patschorke . |
| 4,225,331 | * | 9/1980 | Bittner et al. . |
| 4,417,915 | * | 11/1983 | Dahms . |
| 5,213,602 | * | 5/1993 | Foster et al. . |
| 5,298,049 | * | 3/1994 | Meyer . |
| 5,846,283 | * | 12/1998 | Struckmeier et al. . |
| 5,888,267 | * | 3/1999 | Schumann et al. . |
| 5,935,287 | * | 8/1999 | Graefe et al. . |
| 6,032,492 | * | 5/2000 | Kammonen . |

* cited by examiner

Primary Examiner—Sean Vincent
(74) Attorney, Agent, or Firm—Spencer T. Smith

(57) ABSTRACT

An I.S. glass forming machine has a plurality of individual sections each including a section frame. A deflector adjuster support is secured to and extends vertically upwardly from each of the section frames and a deflector adjuster is mounted on each of the deflector adjuster supports.

2 Claims, 2 Drawing Sheets

I.S. MACHINE

The present invention relates to machinery for manufacturing glass bottles and more specifically to an I.S. (individual section) machine.

BACKGROUND OF THE INVENTION

An I.S. machine has a number of identical sections, usually 8, 10 or 12, and each of these sections has a blank station which receives one or more gobs of molten glass and forms these gobs into a corresponding number of parisons (for purposes of this description, a single gob configuration will be assumed). A single shear mechanism simultaneously shears or cuts the gob from a runner of molten glass, a fixed trough assembly is associated with each blank station for delivering a received gob to the blank station and a gob distributor, which has a pivotal scoop, distributes the sheared gobs in a given sequence to these trough assemblies.

A trough assembly is made up of a stationary upwardly facing inclined trough which receives a gob from the gob distributor scoop and an adjustable downwardly facing deflector which deflects the gob into a vertical path to fall into a blank mold. All the trough assemblies are mounted on an overhead beam. The lower end of each deflector has a transverse lug with a vertical bore. This bore fits over a vertical pin of a deflector adjuster (one for each trough assembly) that is adjustable to enable adjustment of the position of the lower end portion of the deflector in relation to the associated blank mold. All of the deflector adjusters are conventionally mounted on an air manifold which extends from one vertical overhead beam upright to the other. Having these deflector adjusters so mounted cluttered the machine and effectively isolated the front of the I.S. machine (the blow side of the I.S. machine) from the rear of the machine (the blank side of the I.S. machine).

OBJECT OF THE INVENTION

It is accordingly an object of the present invention to provide an improved mounting system for the deflector adjusters.

Other objects and advantages of the present invention will become apparent from the following portion of this specification and from the accompanying drawings that illustrate in accordance with the mandate of the patent statutes a presently preferred embodiment incorporating the principles of the invention.

BRIEF DESCRIPTION OF THE DRAWINGS

Referring to the drawings.

BRIEF DESCRIPTION OF THE PREFERRED EMBODIMENT

Figure 1:
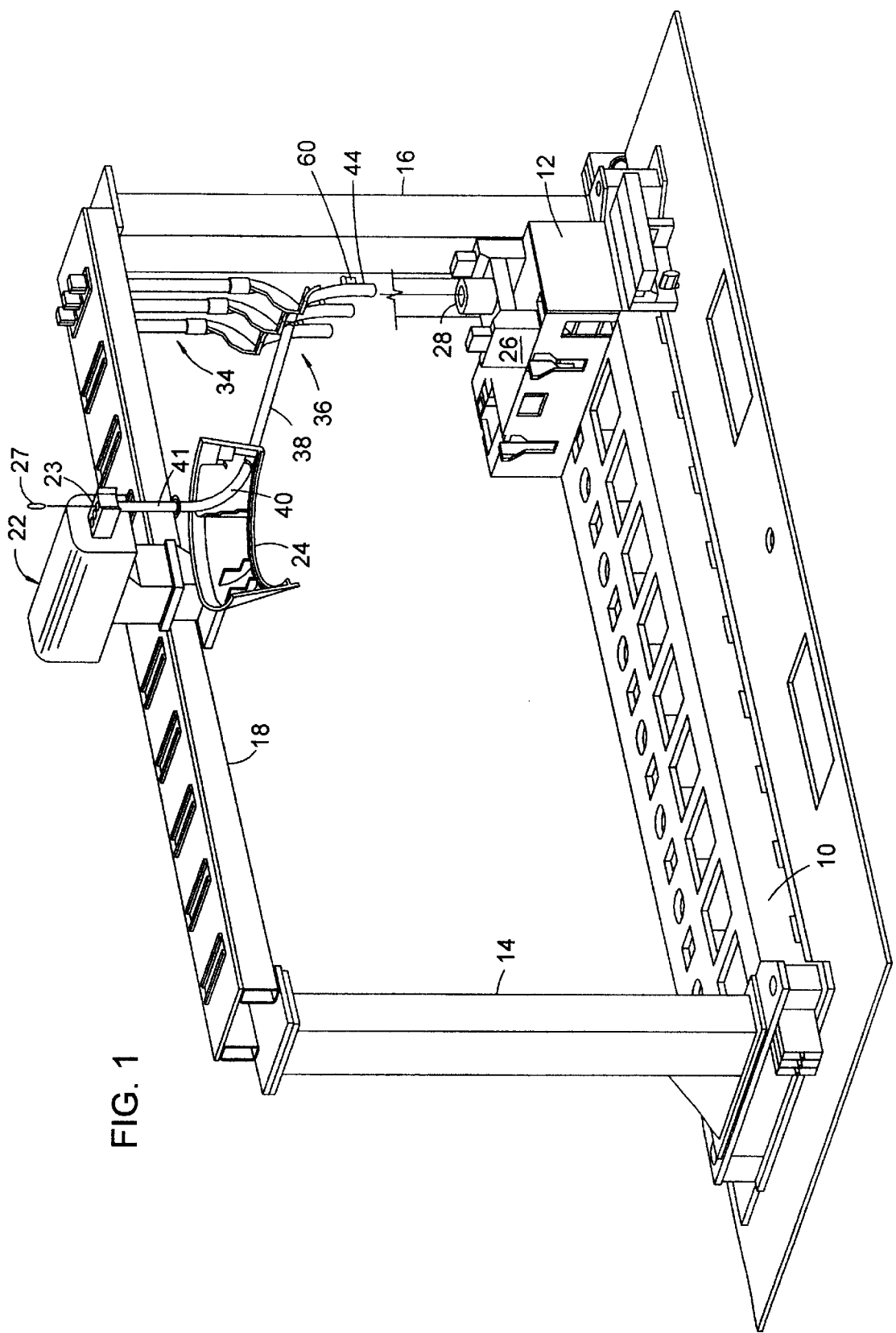
FIG. 1 is an oblique view of a portion of a 10 section I.S. machine made in accordance with the teachings of the present invention.

FIG. 1 discloses a machine bed 10 for an I.S. machine (here a ten section machine). A first vertical upright 14 is fixed to the top surface of the machine bed at one end and a second vertical upright 16 is fixed to the top surface of the machine bed at the other end locating the individual section frames 12 therebetween. Mounted across the top surface of the vertical uprights 14,16 is a horizontal beam 18. Also mounted to the horizontal beam are a gob distributor 22 which has a number of openings 23 corresponding to the number of gobs to be processed in each section (here the machine is a triple gob machine) and an upper trough support 24.

Each individual section frame or box 12 has a parison or blank mold opening and closing mechanism which has a pair of opposed housings 26. Carried by the mold opening and closing mechanism are opposed pairs of blank molds which define a parison or blank mold 28 for each gob to be processed by the section (here only one of sections is shown and only one of the three molds is shown for purpose of clarity). Each mold receives a molten gob 27 from a location above the beam where it is formed by a shear mechanism (not shown) which shears the discrete gob from a runner of molten glass. Details of a conventional mold opening and closing mechanism are disclosed in U.S. Pat. No. 5,865,868.

Individual hangers 34 (one for each section) are mounted on the horizontal beam. Each hanger supports a trough assembly 36 which includes an upwardly facing inclined trough 38 for receiving a gob 27 from a scoop 40 of the gob distributor and a downwardly facing deflector 44 which deflects a gob which has traveled down the trough 38 into a vertical path into the parison mold cavity.

The deflector 44 has a lug 60 with a vertical hole in it (not shown). Complete details of the trough assembly and its mounting are disclosed in U.S. Pat. No. 6,032,492, which is incorporated by reference herein.

Figure 2:
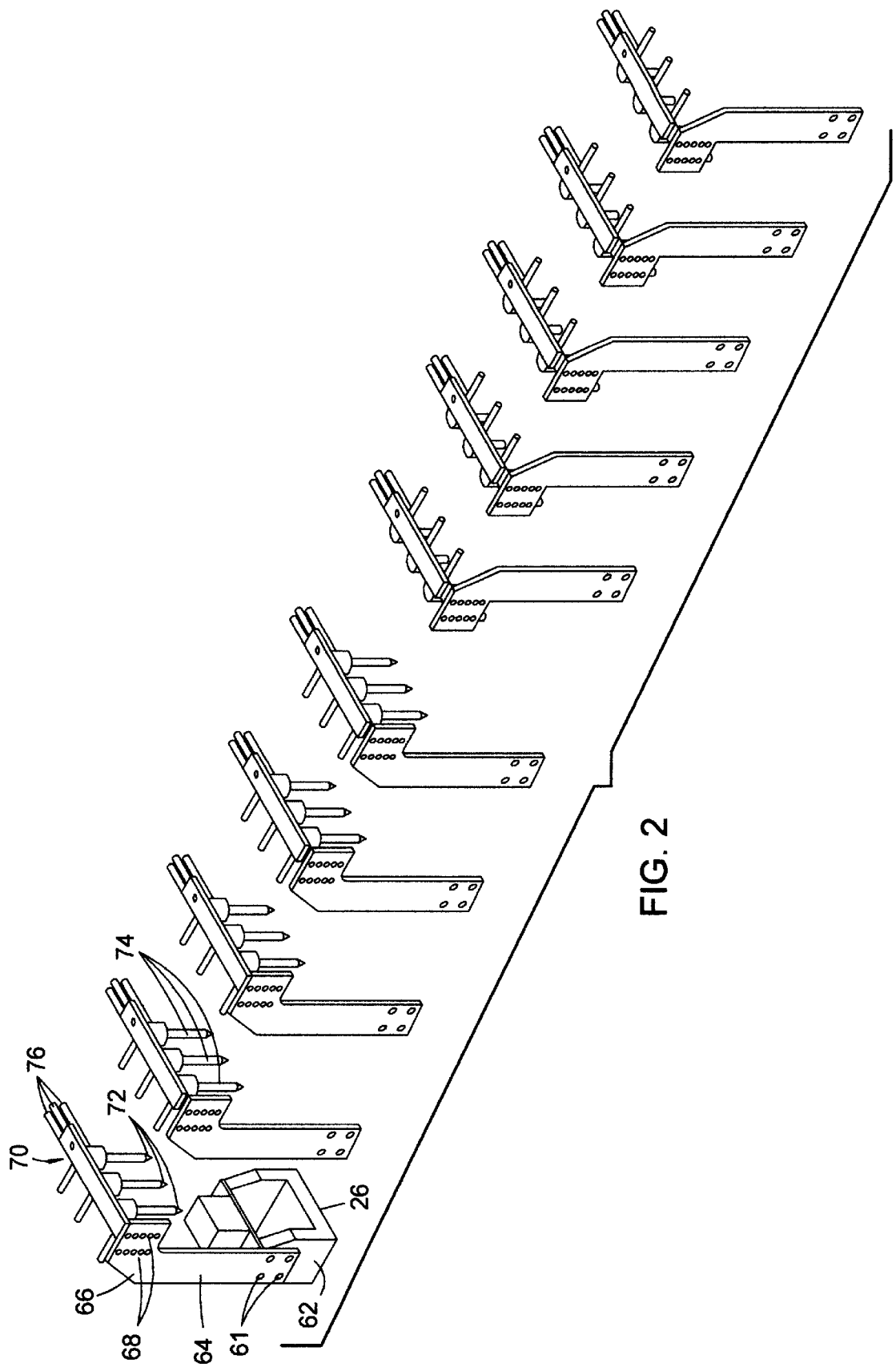
FIG. 2 is an oblique view from the rear of the I.S. machine shown in FIG. 1, of the ten deflector adjuster assemblies which would be mounted on the rear outboard face of the ten blank station mold opening and closing mechanisms which would be on the I.S. machine shown in FIG. 1.

Secured by four screws 61 to the interior side face 62 (FIG. 2) of the outboard housing 26 of each blank station mold open and close mechanism is the bottom portion of a deflector adjuster support 64 of a deflector adjuster assembly (in FIG. 2, only the outboard mold opening and closing housing is illustrated, for purposes of clarity). This support has a top bracket portion 66 having a number of horizontally adjacent pairs of holes 68. A conventional deflector adjuster 70 can accordingly be fastened with screws to this top bracket portion 66 at a number of vertical locations to locate the lower pointed ends 72 of the locating pins 74 in the vertical holes in the three lugs 60 associated with the trough assembly for that section. Each deflector adjuster 70 has a rotatable control 76 for each locating pin so that the location of the pins can be horizontally adjusted to precisely locate the deflectors.

What is claimed is:

1. An I.S. glass forming machine having a plurality of individual sections, each section comprising section frame means, a deflector adjuster support secured to and extending vertically upwardly from said section frame means, a deflector adjuster mounted on said deflector adjuster support.

2. An I.S. machine according to claim 1, wherein said I.S. machine further comprises a mold opening and closing mechanism including a housing, said section frame means comprises a section frame and said housing secured to said section frame, and said deflector adjuster support is secured to said housing.

\* \* \* \* \*